April 3, 1951  H. JETTER  2,547,472

SELECTIVE PRINTING DEVICE WITH ROLLER PLATEN

Filed Feb. 5, 1945  4 Sheets-Sheet 1

Inventor:
Harry Jetter
by Owen W. Kennedy
Attorney

April 3, 1951          H. JETTER          2,547,472
SELECTIVE PRINTING DEVICE WITH ROLLER PLATEN
Filed Feb. 5, 1945          4 Sheets-Sheet 2
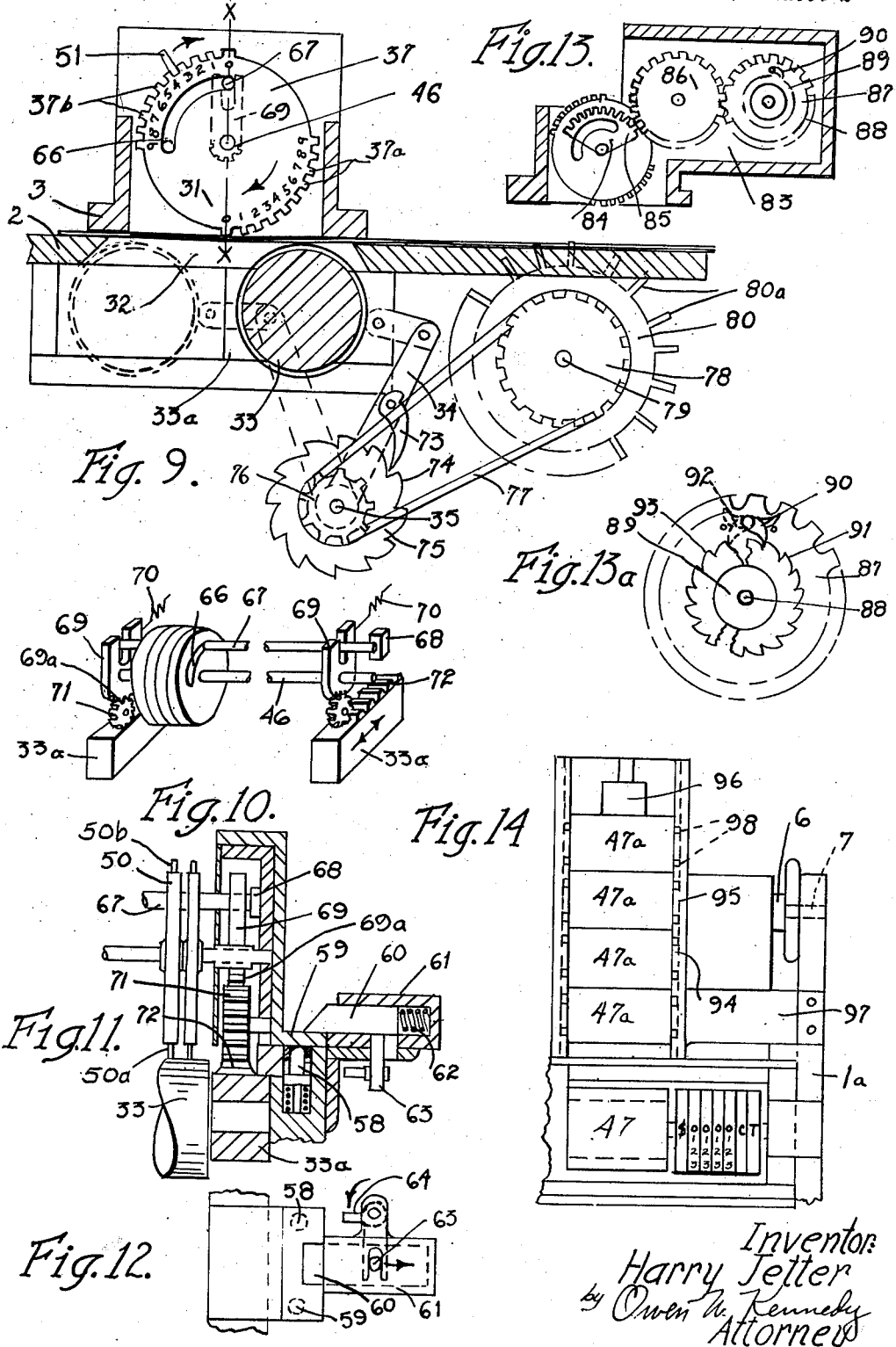

Inventor
Harry Jetter
by Owen N. Kennedy
Attorney

April 3, 1951    H. JETTER    2,547,472
SELECTIVE PRINTING DEVICE WITH ROLLER PLATEN
Filed Feb. 5, 1945    4 Sheets-Sheet 4

Patented Apr. 3, 1951

2,547,472

UNITED STATES PATENT OFFICE 2,547,472

SELECTIVE PRINTING DEVICE WITH ROLLER PLATEN

Harry Jetter, Quincy, Mass., assignor to Joseph A. Dunn, Boston, Mass.

Application February 5, 1945, Serial No. 576,221

11 Claims. (Cl. 101—93)

The present invention relates to business machines in general, and particularly to an improved device for transferring by a single printing operation pertinent accounting record entries concerning a financial transaction, at the same time as making out a check covering the transaction.

The invention has particular reference to payroll transactions since, at the present time, the task of keeping payroll records for concerns having a large number of employees is extremely complicated. This is due to the necessity for not only keeping accurate records of all deductions for various payroll taxes, but also the necessity of providing each employee with a complete record of any such deductions when giving the employee his or her pay check. As will later appear, the device of the present invention may also be employed in connection with the transfer of data to forms other than those related to payroll transactions, such as ledger forms, statements and similar records.

According to the present invention, there is provided an improved device adapted by a single operation to not only transfer all the required payroll entries concerning each employee to the proper payroll record and journal, but also to transfer the same entries to the employee's individual pay check and accompanying stub. Briefly stated, the present invention is characterized by the provision of a master printing bar, or type carrier, providing all the necessary printing characters for setting up the essential data concerning any individual payment to an employee, in association with an assembly of duplicating material and printed forms, such as payroll record sheets, journal sheets, and blank checks. Since the printed matter on the forms is in registering relation, operation of the device causes all essential payroll data to be printed in duplicate, by subjecting the assembled forms to a single impression of the previously set up printing characters. As a result, the operator of the device is able to transfer the selected payroll data to the payroll records and checks, with absolute assurance that all entries relating to a given payment to any individual are made simultaneously on the payroll record, journal, and check. As a result, the entire transaction is completed without any possibility of errors arising as to the amounts involved, or the individual's name, such as might occur were the same data to be entered at different times on different forms.

The above and other advantageous features of the invention will hereinafter more fully appear from the following description, considered in connection with the accompanying drawings, in which—

Figs. 5, 6 and 7 are plan views illustrating payroll record, journal and check forms such as are employed in connection with the device of Fig. 1 to receive impressions of essential data concerning a payroll transaction from the printing bar.

Fig. 8 is a fragmentary view of the underside of the master printing bar removed from the device to show the arrangement of printing characters necessary to produce the particular entries that are shown as having been transferred to the forms shown in Figs. 5, 6 and 7.

Fig. 9 is a fragmentary sectional view along the line 9—9 of Fig. 3, on an enlarged scale.

Fig. 10 is a view in perspective illustrating the means for restoring the printing elements to non-recording position.

Figs. 11 and 12 are fragmentary views illustrating details of the latching device for the printing bar.

Figs. 13 and 13a show operation of a printing element in association with a totalizing device.

Figs. 14 and 14a show operation of the printing bar in association with a magazine for name plates.

Figure 1:
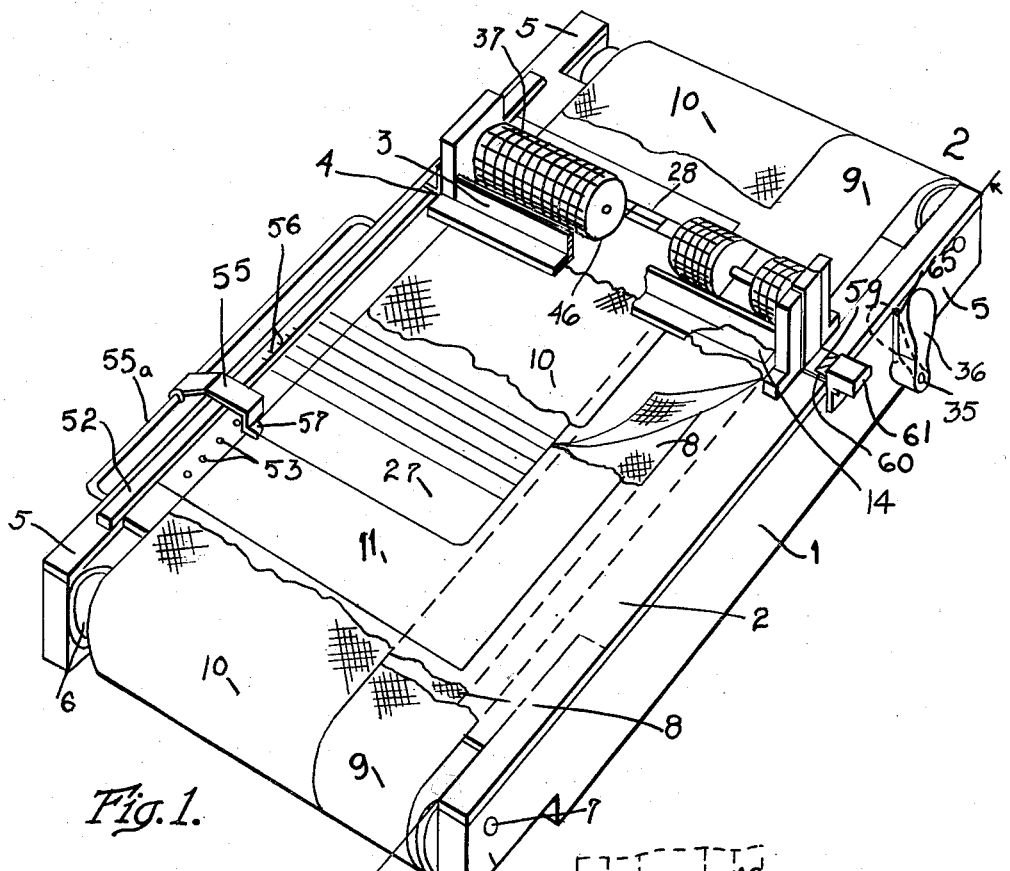
Fig. 1 is a perspective view of a payroll record and check printing device embodying the present invention.

Referring first to Fig. 1, the device is shown as comprising a base 1 providing a flat surface 2 of sufficient area to provide a firm support for an assembly of the several forms shown in Figs. 5, 6 and 7 and hereinafter described in detail. The device also comprises a master printing bar 3 connected to one side of the base 1 by a suitable hinge 4, so that the bar 3 can be turned back as shown in dotted lines in Fig. 2 to permit assembly of the forms on the supporting surface 2.

Figure 2:
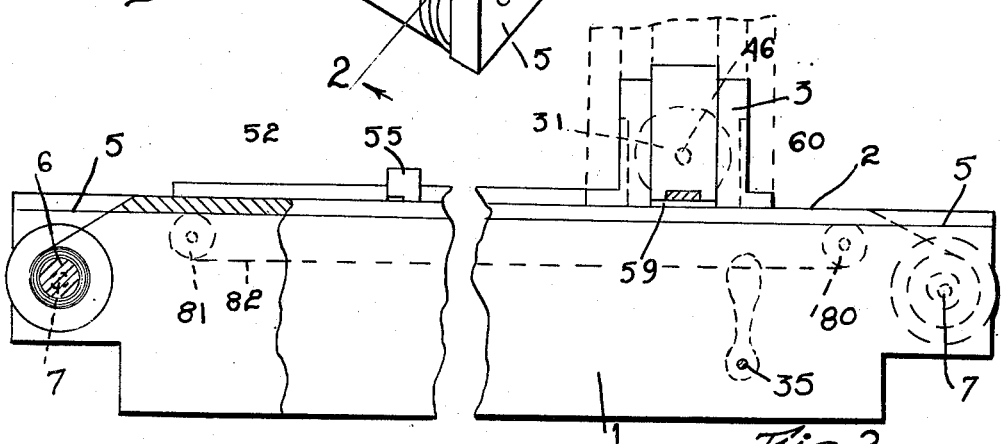
Fig. 2 is a longitudinal sectional view through the device, the section being taken along the line 2—2 of Fig. 1.

The base 1 provides extensions 5 at opposite ends, between which are mounted suitable rolls 6 supported on shafts 7 running between the extensions 5. The rolls serve to support between them three separate webs 8, 9 and 10 of suitable duplicating material, such as carbon paper. As best shown in Fig. 2, one roll 6 serves as a supply roll, while the other roll serves as a takeup roll, so that the three webs 8, 9 and 10 always are disposed in overlying relation longitudinally of the base 1. For the sake of clarity the webs 8, 9 and 10 are shown as being of different widths substantially corresponding to the widths of the several different printed forms employed, although obviously the webs may be of uniform width.

Referring now to Figs. 5, 6 and 7, there is shown a number of different printed forms of the type employed in connection with my invention for the purpose of receiving printed impressions of the essential data concerning a given payment to be made to an employee, in accordance with the previous setting up of such data by printing characters mounted on the master printing bar 3. As will be understood, these particular forms are merely illustrative of suitable forms for receiving the essential data concerning various items which go into a modern payroll record, with the number of items reduced to a minimum by reason of the space limitations of the drawings and printing of the various items on a reduced scale.

Referring now to Fig. 5, there is shown a printed sheet 11 in the form of a payroll journal, such as is commonly employed by bookkeeping departments for receiving the records of the weekly or monthly earnings of individual employees. For this purpose, the journal sheet 11 provides suitable printing 12 extending across the sheet to provide heads for columns below for for receiving data concerning such items as earnings, hours worked, gross pay, tax deductions, and net pay, together with the date, check number and name of the particular employee to whom the check is made payable. Thus each cross line of entries made under the above mentioned column headings will represent all essential data concerning wage payments made to a particular employee as represented by a particular company pay check. As will later be described, these entries are adapted to be transferred to the journal sheet 11 by means of the printing bar 3, and for purposes of illustraton a series of such entires are designated by the reference character 13.

Referring now to Fig. 6, there is shown a printed slip 14 in the form of a payroll check, such as is commonly employed by paymasters for transmitting the earnings of individual employees, the slip comprising a check 15 and a stub 16, separated by the usual perforations 17, so that the stub 16 can be readily detached from the check 15. Since, as previously pointed out, tax regulations require that all wage payments subject to deductions must be accompanied by a statement of such deductions, the stub 16 of the slip 14 provides suitable printing 18, above a data receiving space 19, to indicate such items as hours worked, gross pay, tax deductions and net pay, it being evident that the printing 18 for these items corresponds exactly with similar items forming part of the printing 12 on the payroll journal sheet 11.

The check 15 of the slip 14 provides suitable printing 20 designating the name of the company ant the bank, as well as a space for the signature of a company official. Furthermore, the check 15 provides additional printing 21 to define a space 22 for receiving data concerning such items as the date, the check number, and the name of the employee, it being noted that the printing 21 corresponds in spacing and form to the location of similar items forming part of the printing 12 on the payroll journal sheet 11. In addition, the check is long enough to provide an additional space 23 for receiving the imprint of the amount of the check in such manner that the amount of the check cannot be altered, as will later appear.

From the foregoing, it will be apparent that when printed items on the check 15 and stub 16 are registered with similar printed items on the payroll journal sheet 11, so that the spaces 19 and 22 overlie the spaces below the column headings, operation of the printing bar as above described is adapted to transfer to the check and stub a series of entries 24 and 25 respectively corresponding to the entries 13 on the sheet 11. Furthermore by the same operation, an additional entry 26 stating the exact amount of the check 15 is transferred to the designated space 23.

Referring now to Fig. 7, there is shown a printed sheet 27 in the form of an employee's earnings record, such as is commonly employed by bookkeeping departments for receiving the successive records of the weekly and monthly earnings of individual employees. For this purpose, the record sheet 27 provides suitable printing 28 to provide heads for columns below for receiving data for such items as earnings, hours worked, gross pay, tax deductions and net pay, together with the date and check number of any particular individual payment. In addition, the record sheet 27 provides consecutively numbered cross lines 29 extending under the above mentioned column headings provided by the printing 28. Thus each space between the cross lines 29 is adapted to receive a series of entries 30 transferred by operation of the printing bar 3, with such entries 30 corresponding to the previously described entries 13 on the journal sheet 11 and the corresponding entries 24 and 25 on the check 15 and stub 16, insofar as corresponding items are concerned.

From the foregoing description of the printing on the journal sheet 11, slip 14 and record sheet 27, it will be apparent that when the several items are placed in overlying relation in the order named, with the corresponding printing in registering relation, and with duplicating material such as the carbon webs 8, 9 and 10 therebetween, it will be possible by the single operation of a series of suitable printing devices on the printing bar 3 to transfer duplicate impressions of such printing devices to the several sheets to produce the entries 13, 24, 25, 26 and 30, respectively. To this end, the printing bar 3 provides a series of individual printing devices, indicated generally at 31 in Fig. 9, as projecting below the under surface of the printing bar 3. It is to be noted that the printing devices 31 extend above a slot 32 provided in the sheet supporting surface 2 of the base 1, so that the assembly of payroll record sheets and duplicating webs extend across the slot 32, as indicated.

For the purpose of causing the printing devices 31 to transfer a series of duplicating entries to the journal sheet 11, check 15 and stub 16, and record sheet 27, as previously described, the base 1 provides an impression roll 33 operable in the slot 32. The roll 33 is rotatably supported at its ends by slides 33a that are pivotally connected by links to arms 34 movable about a shaft 35 extending across the base, with the axis of the roll 33 offset with respect to the center line of the slot 32. One end of the shaft 35 projects beyond the side of the base 1, where it is provided with a handle 36, by means of which the arms 34 and roll 33 may be moved from the full to the dotted line position in Fig. 9.

The location of the slides 33a and the diameter of the roll 33 are such that, as the roll 33 moves through the slot 32 from one extreme position to the other, the surface of the roll 33 will pass sufficiently close to the sheet supporting surface 2 of the base to firmly press the assembly of payroll record sheets and duplicating webs against the series of printing elements 31 provided by the printing bar 3. In other words, a single operation of the impression roll 33 from one extreme position to the other will cause the transfer of a series of duplicate entries to the journal sheet 11, check 15, stub 16 and record sheet 27, in accordance with any particular setting of the individual printing devices 31 on the printing bar 3, as will next be described.

Referring now to Figs. 8 and 9, there is shown the construction and arrangement of the printing devices 31 carried by the printing bar 3, in order to produce the various entries 13, 24, 25, 26 and 30 previously described with reference to the payroll material. The under, or printing, side of the bar is shown in Fig. 8, from which it is apparent that the printing devices consist of a number of groups of type elements 37 to 45 inclusive, shown for purposes of illustration as being in the form of disks rotatably mounted on a common shaft 46 extending the length of the bar 3. These type elements are to a large extent similar in construction, in that they provide consecutively numbered type characters 37a to 45a inclusive, adapted to be selectively moved into printing position by turning the individual elements to set up payroll entries, as later described.

While the various type characters 37a to 45a are necessarily shown upside down in Fig. 8, it is apparent from a consideration of the particular arrangement of characters shown that they are adapted to transfer to the assembly of payroll forms shown in Fig. 1 the particular entries previously described. For example, the first group of four type elements 37 are so positioned on the shaft 46, that the particular type characters 37a will produce the proper entries under the general "Earnings" head of the payroll journal 12 and record sheet 27 with particular reference to the first sub-head "Regular." The remaining type elements, reading from left to right, are adapted to set up entries under the following heads, elements 38 for "Other" earnings, elements 39 for "Hours," elements 40 for "Gross Pay," elements 41 and 42 for "Deductions," elements 43 for "Net Pay," elements 44 for suitable month, day and year "Date" entries, and elements 45 for "Check" numbers. It will be understood, of course, that the above enumerated headings are merely illustrative, and may be varied to meet the special needs of any bookkeeping department, without departing in any way from the present invention.

Considering now the next printing device at the right hand end of the printing bar 3, it will be seen that a name plate 47 is mounted adjacent the elements 45 for setting up the pay check number. This name plate 47 contains the name and address of the particular employee to whom the payroll data previously set up specifically refers, for a particular pay period represented by the date set up by the type characters 44a. As indicated, the plate 47 is of the style provided with embossed characters 47a commonly employed in business machines of the "addressograph" class. To this end, the plate 47 provides suitable notches 48 cooperating with positioning pins 49, whereby the plate 47 may be readily attached to or removed from the printing bar 3.

In order to complete the last step of any payroll transaction, namely entry of the amount due on the employee's check 15, the printing bar 3 provides a group of special type elements 50 carrying type characters 50a that are adapted to produce the entries 26 of Fig. 6 in a manner similar to the imprinting of numerals by check printing machines commonly employed to prevent alteration of the amount of any check. Such type characters 50a are adapted to produce a characteristic imprint in the paper of the check, so that the figures representing the amount of the check are indelibly impressed in the paper and cannot be changed.

From the foregoing, it is apparent that the particular arrangement of type characters 37a to 45a inclusive, together with the characters 47a and 50a, are adapted to produce the particular entries previously described with reference to Figs. 5, 6 and 7. While the various elements 37 to 45 inclusive and 50 may be manipulated directly, with the type bar 3 turned back to expose its under side, the invention further contemplates the functioning of the various elements so that the proper entries can be set up from the top of the bar, with reference to numerals that can be read directly, rather than in upside down position. As will later appear, such an arrangement lends to greater accuracy in transferring to the various groups of elements a particular series of entries relating to a given payroll transaction.

Referring now to Fig. 9, there is shown, for purposes of illustration, a particular construction of printing element 37 representative of all of the several groups of elements previously referred to. As will be seen, the periphery of the element 37 provides a series of raised type characters 37a extending through an angle of substantially 90°, with the characters generally located below and to the right of the shaft 46. The element 37 also provides a series of consecutively numbered indicia 37b, also arranged through an angle of 90°, diametrically opposed to that portion of the periphery of the element carrying the type characters 37a, with the indicia generally located above and to the left of shaft 46. Thus, indicia 37b for the numeral "One" is displaced from the character 37a for the numeral "One" by an angle of exactly 180°, with the other indicia in corresponding relation to the other characters.

Figure 3:
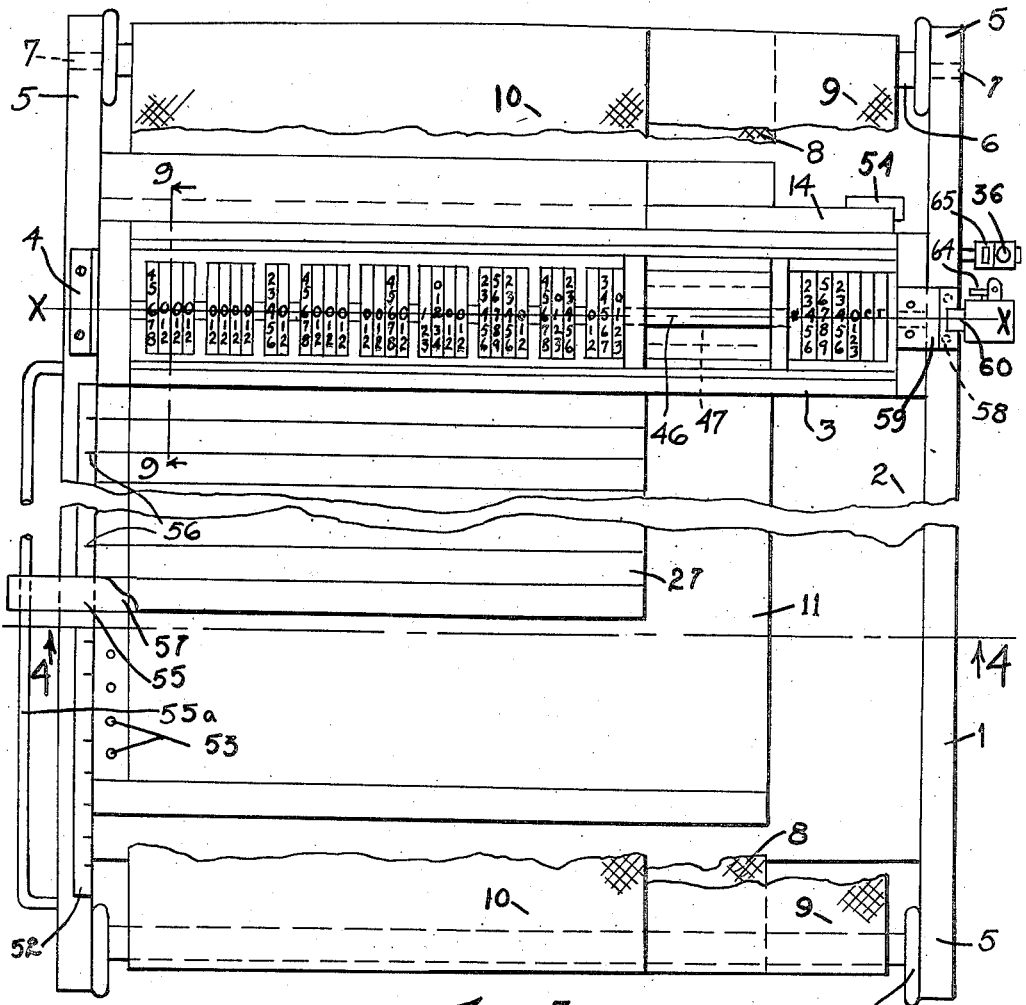
Fig. 3 is a plan view of the device shown in Fig. 1.

Therefore, when the element 37 is turned to bring a particular indicia 37b at the very center of the top of the printing bar 3, as shown in Fig. 3, the particular numeral corresponding to the indicia selected is represented by a type character 37a positioned in exact alinement with the middle of the slot 32, where the surface of the impression roll 33 will be tangent in its printing position. Obviously, the indicia 37b may be in the form of raised characters or countersunk characters, in color, as desired, with each element providing a suitable operating projection, such as a pin 51 extending beyond the top of the printing bar 3, so that it may be readily swung in either direction through an arc of substantially 180°, and always above the shaft axis.

As previously noted, the construction and operation of the printing elements 37 is representative of all the other elements 38 to 45 ininclusive and 50, so that the top of the bar 3 provides a series of operating pins 51 corresponding in number to the series of complete printing devices 31. Since the several series of elements 37 to 45 inclusive and 50 provide indicia 37b to 45b inclusive and 50b, which may be read directly from the top of the bar, as shown in Fig. 3, it is an easy matter to set up all essential payroll data concerning a given employee's payment by turning the various pins 51 until the associated indicia show the exact arrangement and amount of the entries that it is desired to reproduce on an assembly of the several forms shown in Figs. 5, 6 and 7.

Referring now to Figs. 1 and 3, the first step in forming such an assembly consists in turning back the printing bar 3 on its hinge 4, and then placing the payroll journal or summary sheet 11 on the surface 2, with its left hand margin in engagement with a raised guide 52 extending along the margin of the surface 2. Assuming that a fresh sheet is being used, the location of the sheet 11 is such that the line of printing 12 is slightly offset from the printing axis X—X which passes through the shaft 46 on which the printing elements are mounted, see Fig. 9. In order to expedite positioning of the sheet 11, its left hand margin provides a series of perforations 53, so spaced as to correspond to the various lines of entries that are to be subsequently made.

It is to be noted from a comparison between Figs. 5 and 7 that the perforations 53 substantially correspond to the spacing between the cross lines 29 on the earnings record or ledger form sheet 27. The perforations on the sheet 11 also serve as an additional purpose, in that they provide means whereby the sheet 11 may be automatically moved a distance equal to the desired spacing between successive entries, in timed relation with operation of the handle 36, by which the impression roll 33 is caused to transfer impressions of the type characters to the assembly of sheets, as will be later described.

The sheet 11 having been positioned, the duplicating web 8 is placed over the sheet, after which the slip 14 comprising the pay check 15 and stub 16 is placed in position, with its printing 18 overlying and in register with the printing 12 on sheet 11. It is to be noted that the right hand end portion of the slip 14 extends beyond the right hand margin of sheet 11, so as to bring the space immediately below the printing 21 in alinement with the printing axis X—X. In order to insure that the slip 14 will be properly registered, the surface 2 provides a gauge 54 of right angle form, into which the upper right hand corner of the check 15 may be readily fitted. It is to be noted in Fig. 3 that the gauge 54 lies outside of the upper edge of the printing bar 3, so that the operator of the device is assured that the slip 14 is in proper registration for the printing operation when the bar is turned down to the position of Fig. 1. Obviously, the slip 14 could be provided with suitable perforations 14a, indicated in dotted lines in Fig. 6, so as to cooperate with fixed pins on the surface 2, if desired.

The check and its stub having been positioned, the duplicating web 9 is drawn over the slip as indicated in Fig. 1, after which the sheet 27 representing the earnings record or ledger form is placed in position, with its left hand margin against the guide 52. In order to insure that any space between cross lines 29 on the sheet 27 will register with the printing axis X—X, the guide 52 provides an adjustable gauge 55 cooperating with markings 56 on the guide 52 having the same spacing between them as the lines 29 on the sheet 27.

Figure 4:
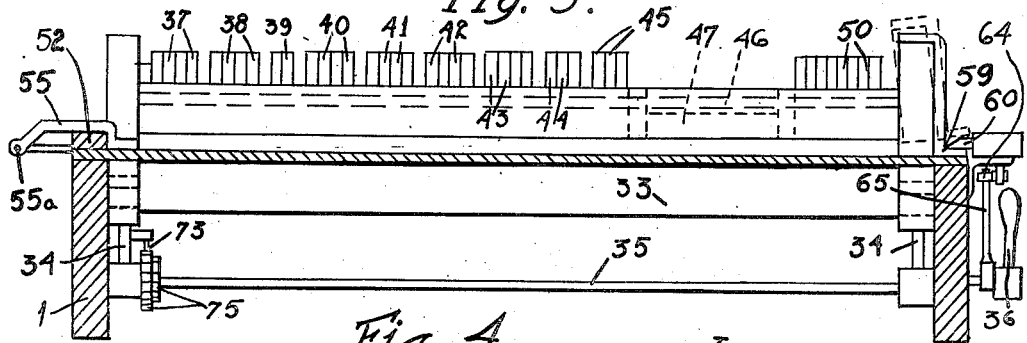
Fig. 4 is a transverse sectional view along the line 4—4 of Fig. 3, looking in the direction of the arrows.

As best shown in Figs. 3 and 4, the gauge 55 extends to the right beyond the edge of the guide 52 and provides an overhanging lip 57 for receiving the lower left hand corner of the sheet 27. Assuming that a fresh sheet 27 is to be employed and that the upper edge of the gauge 55 coincides with the guide marking "one," it will be evident that when the sheet 27 is positioned as shown in Fig. 3, the space between the printing 28 and the first cross line 29 will be alined with the printing axis X—X. In the event that the sheet 27 contains a number of previously made entries 30 between the lines 29, obviously the gauge 55 would be moved upwardly on a rod 55a parallel to the guide 52 to bring its upper edge into registry with the particular marking 56 corresponding to the number of the next vacant space between the lines 29. With these spaces on the sheet 27 consecutively numbered as shown in Fig. 7, obviously the proper guide marking 56 can be determined very quickly by noting the number of entries 30 previously made on the sheet 27.

The final step in completing the assembly of material on the surface 2 consists in placing the third duplicating web 10 in position, after which the printing bar 3 is turned down to the position of Fig. 1, preparatory to setting up a series of entries on the printing devices 31. When the printing bar 3 is swung downwardly to overlie the surface 2, it does not immediately assume a position in which its lower edge is exactly parallel to the surface 2, and in which the lower peripheries of the printing devices 31 would project into the slot 32 as shown in Fig. 9. On the contrary, the bar 3 occupies a pre-printing position, in which its outer end is yieldingly supported by a pair of spring pressed pins 58 seated in a side member 1a of the base 1, and engaging the under surface of a latch plate 59 at the free end of the bar, see Fig. 11.

This pre-printing position is indicated in dotted lines in Fig. 4, from which it is apparent that the outer end of the bar 3 is held sufficiently above the plane of the surface 2 by the pins 58 so as to permit the several printing elements 37 to 45, inclusive, and 50 to be turned freely in setting up a series of entries in the manner previously described. That is to say, the pre-printing position of the bar insures that movement of the various type characters on the printing elements into their desired positions will not exert any appreciable pressure on the uppermost web 10 of duplicating material, such as would cause any marks on the sheet 27 beneath the same. It is also evident from Fig. 9 that the assembly of form sheets and duplicating material extends freely across the slot 32 in the surface 2, so that the sheets are unsupported below the bar 3 and exhibit no tendency to press against the type characters, so long as the impression roll 33 remains in its retracted position, as shown.

Assuming then that the printing elements have been manipulated by means of the pins 51 to set up a series of payroll entries such as are shown in Figs. 5, 6 and 7, the next step consists in applying a downward pressure to the free end of printing bar 3 to cause the latch plate 59 on the bar to engage the beveled end of a bolt 60, against which the end of the plate bears lightly in its pre-printing position when supported by the pins 58. When this occurs, the bolt 60 retracts until the end of the plate 59 lies flat in the plane of the surface 2, whereupon the bolt 60 springs to the left to latch the bar in the full line position of Figs. 4 and 11. With the bar 3 so latched, the operator has a clear view of all of the indicia on the previously set up printing elements, so that a final check can be made on the accuracy of the data that is to be transferred to the assembled forms by operation of the impression roll 33.

When it is desired to transfer the impressions to the forms, the handle 36 is moved from the full to the dotted line position of Fig. 1. When this occurs, the roll 33 moves through the slot 32 parallel to the printing axis X—X, so that its upper periphery presses the assembly of forms and duplicating material against the particular series of type characters that have been previously set up. The functioning of the roll 33 is illustrated clearly in Fig. 9, from which it is apparent that as the roll moves from left to right with the slides 33a, the top of the roll will move in a horizontal plane substantially tangent to the type characters on the printing elements. Therefore, an extremely firm and positive upward pressure will be exerted on the assembled forms and duplicating material to cause the type characters on the then-locked printing bar 3 to simultaneously make clear impressions of the entries 13, 30, 24, 25 and 26 on the payroll journal sheet 11, the earnings record sheet 27, the check stub 16, and the check 15, all as shown in Figs. 5, 6 and 7.

In order to prevent a second impression by the printing elements on the assembled forms, on return movement of the handle 36 from the dotted to the full line position of Fig. 1, means are provided for unlatching of printing bar 3 in advance of any such return movement. As best shown in Figs. 11 and 12, the bolt 60 is movable in a casing 61, and the bolt is normally urged in its latching position by a spring 62 within the casing. The bolt 60 provides a pin 63 movable through a slot in the casing, and the lower end of this pin is engageable by a pivoted trip arm 64. For the purpose of operating the bolt, the shaft 35 on which the handle 36 is mounted also carries a lever 65 extending parallel to the handle 36 which operates the impression roll 33. The lever 65 is so positioned on the shaft 35 that it is adapted to engage and turn the trip arm 64 just before the arms 34 reach the dotted line position of Fig. 9, in which they are inclined to the left.

Therefore, when the impression roll 33 is moved from its full to its dotted line position of Fig. 9, during which travel it completes the printing operation, the lever 65 operates the trip arm 64 just as this movement is completed. The resulting retraction of the bolt 60, indicated in dotted lines in Fig. 11, releases the end of the latch plate 59 so that the previously compressed pins 58 are then free to lift the end of the printing bar into the dotted line position of Fig. 4. As a result, the return movement of the roll 33 by the handle 36 takes place without causing a second printing operation, since the type characters are then no longer in that portion of the slot 32 through which the upper periphery of the roll 33 passes.

In order to restore all the printing devices 31 to a non-printing status, preparatory to setting up another series of entries, the invention contemplates automatic means for accomplishing this result each time the impression roll 33 is operated. As best shown in Figs. 9 and 10, each of the printing elements 37 to 45, inclusive, and 50 provides a curved slot 66 concentric about the axis of the shaft 46 on which the printing elements are turnable. A restoring rod 67 extends freely through all of the alined slots 66, and the rod 67 is normally maintained in the position of Fig. 9, wherein any one of the printing elements can be turned in a clockwise direction to obtain a given setting of the indicia and type characters thereon.

As best shown in Fig. 10, the rod 67 is maintained against fixed stops 68 at opposite ends thereof by means of a pair of arms 69 turnable freely on the shaft 46, with springs 70 tending to yieldingly maintain the arms 69 in the position shown. The lower end of each arm 69 provides gear teeth 69a in mesh with a pinion 71, and each pinion 71 is adapted to be engaged by rack teeth 72 formed on the upper surface of each slide 33a for the impression roll 33.

When the roll 33 occupies the full line position of Fig. 9, that is with the roll operating arms 34 inclined rearwardly, the rack teeth 72 are completely disengaged from the pinions 71, and the rod 67 remains seated against the stops 68, while the various printing elements are turned on the shaft 46 to set up a series of entries. Furthermore, the rod 67 remains in this initial position while the impression roll 33 moves through the middle of the slot 32 to bring about the previously described printing operation.

However, as the roll 33 completes its right to left movement of Fig. 9, and is entirely clear of the printing elements, the rack teeth 72 engage the pinions 71 and through them turn the arms 69 in a counterclockwise direction until the rod reaches the dotted line position of Fig. 9. When this occurs, all of the previously operated elements 37 to 45, inclusive, and 50 are turned in unison from their set-up positions to their non-printing positions shown in Fig. 9. When the handle 36 is moved rearwardly to return the roll 33 to the full line position of Fig. 9, the pinions 71 are turned in the reverse direction to thereby move the arms 69 clockwise about the shaft 46 and return the rod 67 into engagement with the stops 68, where it is held by the springs 70 after the rack teeth 72 disengage the pinions 71.

Therefore, each complete back and forth movement of the handle 36 will not only unlatch the printing bar 3 to prevent a second impression, but will also restore all of the printing elements to their initial non-printing positions, in which a series of zeros will be shown by the indicia along the top of the printing bar as viewed in Fig. 3.

As previously indicated, the payroll journal or summary sheet 11 provides a series of marginal perforations 53, the purpose of which is to provide for step-by-step movement of the sheet 11 in timed relation with operation of the impression roll 33 by the handle 36. Such an arrangement is illustrated in Fig. 9, wherein the left hand arm 34 for operating the impression roll slide 33a provides a pivotally mounted pawl 73 in engagement with the teeth 74 of a ratchet wheel 75 turnable on the shaft 35. The ratchet wheel 75 has a sprocket wheel 76 turnable therewith, and a chain 77 connects the sprocket wheel 76 to a similar wheel 78 turnable on a shaft 79 mounted on the left hand side member 1a of the base 1 near the upper roll 6 which carries the duplicating material.

The shaft 79 also carries a wheel 80 providing a series of projecting pins 80a that are adapted to be received in the perforations 53 of the sheet 11. Therefore, each time the handle 36 is moved from the full to the dotted line position of Fig. 1 to cause a printing operation, the pawl 73 advances over the periphery of the ratchet wheel to engage a tooth 74 as the arm 34 reaches a substantially vertical position. When the handle 36 is moved to return the roll 33 to its former position, the ratchet wheel 75 is turned, thereby imparting rotative movement to the pin wheel 80 through the space of one tooth. It is to be noted that when the sheet 11 is moved by the pin wheel 80, the printing bar 3 has already been unlatched and therefore there is no appreciable frictional resistance to advancement of the sheet 11 a distance equal to the spacing between the lines 29 on the earnings record or ledger form sheet 27.

As a result of the above described automatic feeding of the sheet 11, the sheet is properly positioned to bring its next blank space into line with the printing axis X—X preparatory to positioning another sheet 27 and slip 14 to receive a new series of payroll entries with respect to another employee. Therefore, the sheet 11 will bear successive entries of different employee's names in the order in which the checks 15 are made out, with all the essential data appearing on the sheet 11 to correspond with the data that is entered on the check stub 16 for each particular payroll transaction.

While the payroll journal is shown as a cut sheet 11 in Figs. 1 and 5, obviously it could be in the form of a continuous web, in which event a second pin wheel 81 would be provided at the opposite end of the base member 1a, as indicated in dotted lines in Fig. 2. This second pin wheel 81 would be connected by a suitable chain 82 to the driven pin wheel 80, as also indicated in dotted lines, so that with the payroll journal in the form of a continuous web passing around both pin wheels 80 and 81, the web could travel underneath the duplicating material without interfering with the latter.

Referring now to Fig. 13, there is shown an arrangement whereby the movement of any one of the printing elements 37 to 45, inclusive, can be utilized in connection with an associated totalizing device, generally indicated by the reference character 83. The purpose of this totalizing device is to make an accumulative record of successive manipulations of the printing elements to set up essential data with respect to separate financial transactions, such as pay checks, so that the totalizing device will show what the totals are for any one of the several headings shown on the form sheets, over a given period.

In the modified arrangement of Fig. 13, the printing element 37 provides a sector 84 in the form of a plate having teeth 85 corresponding in number to the number of indicia 37a on the element 37. It is to be noted that the angular spacing between the teeth corresponds to the angular spacing between the indicia 37a.

The teeth of the sector 84 are in engagement with a gear 86, the teeth of which have the same angular spacing as the sector teeth 85, and the gear 86 is in mesh with a gear 87 similar to the gear 86. The gear 87 is freely turnable on a shaft 88 carrying a totalizing element 89 forming part of a totalizing device of any desired sort, wherein the successive turning movements imparted to the element 89 will result in setting up numbers representing an accumulative turning of the element 89, or a group of such elements.

In order to impart such movement to the element 89 in one direction only, the gear 87 carries a pawl 90 bearing on the teeth 91 of a ratchet turnable with the element 89. The teeth 91 have the same angular spacing as the teeth of the gears 87 and 88. Consequently, should the printing element 37 be turned through the space of three indicia 37b to set up the number "three", the totalizing element 89 will be turned through the displacement of three ratchet teeth 91 in a clockwise direction.

However, when the printing element 37 is turned in a counterclockwise direction by the clearing rod 67 in order to return it to zero setting, as previously described, this return movement is not imparted to the totalizing element 89. This is because the pawl 90 will slip over the teeth 91, without turning the element 89 when the gear 87 is turned in a counterclockwise direction, in response to return of the printing element 37 to its initial position.

The totalizing arrangement also provides means for subtracting any desired amount from the recorded total, should it be necessary to correct an error resulting from turning any one of the printing elements to the wrong position, in setting up the desired data. To this end, the element 89 provides an auxiliary pawl 92 mounted beside the pawl 90 and adapted to engage teeth 93 facing in the opposite direction as compared to the teeth 91. As best shown in Fig. 13a, in which the ratchet teeth 91 are shown partially broken away, the pawl 92 is normally held out of engagement with the teeth 93, as shown in full lines, so that the counterclockwise turning of the gear 87 normally has no effect on the element 89. However, should the printing element 37 be turned by mistake to a wrong digit, and it is desired to rectify this mistake by substracting the wrongly entered amount, the pawl 90 is disengaged from the teeth 91 while the other pawl 92 is engaged with the teeth 93, as shown in dotted lines. This having been done, the particular printing element which has incorrectly operated is turned, independently of all the other elements, to show the particular amount which has been wrongly entered. Due to the disengagement of pawl 90, the totalizing element 91 is not turned when this occurs. However, on the return movement of the previously operated printing element to its original position, the auxiliary pawl 92 engages the teeth 93 to turn the element 89 in a counterclockwise direction, the amount that it has been previously displaced when the error was made. Following this manipulation which results in subtracting the wrongly entered amount from the totalizer, the pawls 90 and 92 are returned to their normal positions, that is, with the pawl 90 engaged and the pawl 92 disengaged, so that thereafter the proper number can be set up and added to the totalizer by normal operation of the printing element in question.

Referring now to Fig. 14, there is shown an arrangement whereby a series of name plates, similar to name plate 47 although with different type characters, can be supplied to the printing bar 3 following successive operations of the printing devices. In the preparation of a payroll involving the use of a considerable number of individual name plates, such name plates would be arranged in either alphabetical or numerical order and placed in a magazine 94. These name plates are designated at 47a and would be slidable between guides 95 provided by the magazine, so as to be movable flatwise by means of a suitable feeding head 96.

The magazine 94 is constructed as an attachment to the printing device, to which end it provides a suitable bracket 97 secured to the right hand side member 1a of the base 1. Thus the magazine 95 overlies the surface 2 which supports the forms, with the bottom of the magazine 94 lying in the same plane as the plane of the name plate 47, as carried by the printing bar 3. With the several name plates 47a arranged in alphabetical or numerical order, obviously the setting up of the payroll data for a given number of employees is greatly expedited. When the magazine is used in connection with the printing bar 3, the change of name plates following a printing operation can be very quickly accomplished by the operator, either by hand or by moving the feed head 96 between the guides 95 a distance equal to the width of a plate.

Figure 14A:
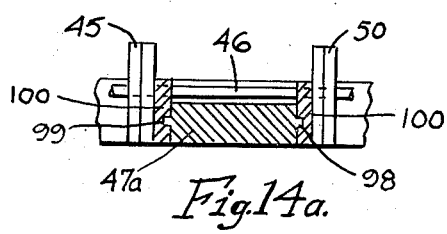

When utilizing the head 96 to cause feeding of the name plates 47a, the plates are provided with edge lugs 98 adapted to slide in the guides 95, and also receivable in grooves 99 provided in cross members 100 of the printing bar, as shown in the fragmentary view of Fig. 14a. It is to be noted that the lugs 98 are above the bottom of the plate 47a, from which the type characters of the plate project downwardly into the same plane as the type characters 45b and 50b of the adjacent printing elements. With this arrangement, movement of the feed head 96, through a distance equal to the width of a name plate 47, will result in the name plate farthest removed from the head being positioned on the printing bar as its lugs 98 enter the grooves 99, thereby displacing the printing plate which has previously been utilized in connection with a printing operation.

From the foregoing, it is apparent then that by the present invention there is provided an improved printing device for accounting records and checks, whereby the essential data concerning a financial transaction can be simultaneously entered by a printing operation on gauged forms having printed material in registering relation, with reference to which the entries of the set-up data are placed. While for purposes of illustration, the invention has been specifically shown and described as applied to payroll records, the invention is not so limited in its application, but on the contrary can be employed in connection with other types of forms relating to other kinds of financial transactions, such as the payment of a series of different amounts to different creditors who correspond to different employees. That is to say, the form previously referred to as the payroll journal would then be a summary sheet, whereas the earnings record of an individual employee would then be a ledger form, showing successive payments to the same creditors. Insofar as the assembly of forms, the setting up of the essential data by the printing devices and the printing operation are concerned, the manipulation of the device is the same, irrespective of the particular types of forms employed.

I claim:

1. A portable printing device of the class described, comprising, a box-like frame, a table surface mounted on the top of said frame, said table surface having a slot disposed crosswise thereof, a printing member hingedly secured at one side of said table surface so as to extend over the slot and crosswise of said table surface, latching means positioned at the other side of said table surface for releasably maintaining said printing member in position over said slot, means associated with said table surface for guiding a sheet to be printed lengthwise over said surface, a platen element mounted within said frame and beneath said table surface adjacent the slot, means in the form of a manually operable handle member connected with said platen element and disposed at one side of said frame for shifting said platen element within the slot and back and forth relative to said printing member so as to urge the sheet to be printed against said printing member, in one direction of movement, and means actuated by said handle member for operating said latching means at the end of such movement to prevent said printing member from contacting said sheet during return movement of said platen element in the opposite direction.

2. A portable printing device of the class described, comprising, a box-like frame, a table surface mounted on the top of said frame, said table surface having a slot disposed crosswise thereof, a printing member pivotally mounted at one side of said table surface so as to extend over said slot and crosswise of said table surface, latching means for releasably holding said member in printing position over said slot, printing elements carried by said printing member and operable manually and separately for selectively setting up data to be entered on a sheet, means associated with said table surface for guiding a sheet to be printed lengthwise over said surface, a platen element mounted within said frame and beneath said table surface adjacent the slot, a handle member mounted at one side of said frame, means connecting said handle member with said platen element for shifting the latter within the slot and relative to said printing member so that it will urge the sheet to be printed against the selected elements on said printing member, and means actuated by said handle member, following the printing operation, to operate said latching means and release said printing member, to thereby prevent said printing elements from engaging said sheet on the return movement of said platen element.

3. A portable printing device of the class described, comprising, a box-like frame, a table surface mounted on the top of said frame, said table surface having a slot disposed crosswise thereof, a printed member hingedly secured at one side of said table surface so as to extend over said slot and crosswise of said table surface, locking means positioned at the other side of said table surface for releasably maintaining said printing member in position over said slot, means associated with said table surface for guiding a sheet to be printed lengthwise over said surface, a platen element mounted within said frame and beneath said table surface adjacent the slot, means in the form of a handle member connected with said platen element and disposed at one side of said frame for shifting said platen element within said slot and relative to said printing member so that it will urge the sheet to be printed against said printing member, and means connected with and actuated by said handle member for releasing said locking means upon the completion of the printing operation.

4. A portable printing device of the class described, comprising, a box-like frame, a table surface mounted on the top of said frame, said table surface having a slot disposed crosswise thereof, a printing member hingedly secured at one side of said table surface so as to extend over said slot and crosswise of said table surface, locking means positioned at the other side of said table surface for releasably maintaining said printing member in position over said slot, means associated with said table surface for guiding a sheet to be printed lengthwise over said surface, a platen element mounted within said frame and beneath said table surface adjacent the slot, a handle member connected with said platen element and disposed at one side of said frame, said handle member being adapted to be advanced manually in one direction for causing a movement of said platen element within the slot and toward said printing member thereby to perform a printing operation, and to be returned in a second direction for withdrawing said platen element from said printing member, means connected with and actuated by said handle member for releasing said locking means upon the completion of the printing operation, sheet-feeding means disposed within said frame and extending upwardly to the top surface of said table for engaging the sheet to be printed, and means connecting said sheet-feeding means with said handle member for actuating said sheet-feeding means simultaneously with the return movement of said handle member.

5. A portable printing device of the class described, comprising, a box-like frame, a table surface mounted on the top of said frame, said table surface having a slot disposed crosswise thereof, a printing member hingedly secured at one side of said table surface so as to extend over said slot and crosswise of said table surface, printing elements carried by said member and operable separately for selectively setting up data to be entered on a sheet, means positioned at the other side of said table surface for releasably maintaining said printing member in position over said slot, means associated with said table surface for guiding a sheet to be printed lengthwise over said table surface and beneath said printing member, a platen element mounted within said frame and beneath said table surface adjacent the slot, a handle member connected with said platen element and disposed at one side of said frame, said handle member being adapted to be adanced manually in one direction for causing a movement of said platen element within the slot and toward said printing member thereby to perform a printing operation, and to be returned in a second direction for withdrawing said platen element from said printing member, means connected with and actuated by said handle member for releasing said locking means upon the completion of the printing operation, sheet-feeding means disposed within said frame and extending upwardly to the top surface of said table for engaging the sheet to be printed, means for resetting said printing elements on said printing member preparatory to setting up new data thereon, and means connecting said sheet-feeding member and said resetting means with said handle so that they will be actuated in response to the return movement of said handle.

6. A portable printing device of the class described, comprising, a box-like frame, a table surface mounted on the top of said frame, said table surface having a slot disposed crosswise thereof, a printing member secured at one side of said table surface so as to extend over said slot and crosswise of said table surface, printing elements carried by said member and operable separately for selectively setting up data to be entered on a sheet, a pair of rolls of which each is supported at a respective one of the end portions of said frame and below the top of said table, a web of duplicating material trained about both of said rolls and over the top surface of said table and beneath said printing member, means associated with said table surface for guiding a sheet to be printed lengthwise over said table surface and beneath said web of duplicating material, a platen element mounted within said frame and beneath said table surface adjacent the slot, a handle member connected with said platen element and disposed at one side of said frame, said handle member being adapted to be advanced manually in one direction for causing a movement of said platen element within the slot and toward said printing member thereby to perform a printing operation, and to be returned in a second direction for withdrawing said platen element from said printing member, means for resetting said printing elements on said printing member preparatory to setting up new data thereon, and means connecting said resetting means with said handle for actuating the latter in response to the return movement of said handle.

7. A portable printing device of the class described, comprising, a box-like frame, a table surface mounted on the top of said frame, said table surface having a slot disposed crosswise thereof, a printing member secured at one side of said table surface so as to extend over said slot and crosswise of said table surface, printing elements carried by said member and operable separately for selectively setting up data to be entered on a sheet, a pair of rolls of which each is supported at a respective one of the end portions of said frame and below the top of said table, a plurality of webs of duplicating material trained about both of said rolls and over the top surface of said table and beneath said printing member, means associated with said table surface for guiding a plurality of sheets to be printed lengthwise over said table surface and between said duplicating webs, a platen element mounted within said frame and beneath said table surface adjacent the slot, a handle member connected with said platen element and disposed at one side of said frame, said handle member being adapted to be advanced manually in one direction for causing a movement of said platen element within the slot and toward said printing member thereby to perform a printing operation, and to be returned in a second direction for withdrawing said platen element from said printing member, sheet-feeding means disposed within said frame and extending upwardly to the top surface of said table for engaging the sheets to be printed, means for resetting said printing elements on said printing member preparatory to setting up new data thereon, and means connecting said sheet-feeding member and said resetting means with said handle so that they will be actuated in response to the return movement of said handle.

8. A portable printing device of the class described, comprising, a box-like frame, a table surface mounted on the top of said frame, said table surface having a slot disposed crosswise thereof, a printing member secured at one side of said table surface so as to extend over said slot and crosswise of said table surface, printing elements carried by said member and manually operable separately for selectively setting up data to be entered on a sheet, means associated with said printing member for simultaneously resetting all of said printing elements on said printing member preparatory to setting up new data thereon, a pair of rolls of which each is supported at a respective one of the end portions of said frame and below the top of said table, a web of duplicating material trained about both of said rolls and over the top surface of said table and beneath said printing member, means associated with said table surface for guiding a sheet to be printed lengthwise over said table surface and beneath said duplicating web, a slide bar mounted within said frame for rectilinear movement lengthwise of said frame, a platen element mounted within said frame and connected with said slide bar adjacent the slot, means carried by said slide bar for engaging and actuating said resetting means, and a manually operable handle disposed at one side of said frame and connected with said slide bar, said handle being adapted to be advanced in one direction for causing a shifting of said slide bar thereby to move said platen element within the slot and toward said printing member so as to perform a printing operation, and to be returned in a second direction for withdrawing said platen element from said printing member and resetting said printing elements.

9. A portable printing device of the class described, comprising, a box-like frame, a table surface mounted on the top of said frame, said table surface having a slot disposed crosswise thereof, a printing member secured at one side of said table surface so as to extend over said slot and crosswise of said table surface, printing elements carried by said member and manually operable separately for selectively setting up data to be entered on a sheet, means associated with said printing member for simultaneously resetting all of said printing elements on said printing member preparatory to setting up new data thereon, a pair of rolls of which each is supported at a respective one of the end portions of said frame and below the top of said table, a web of duplicating material trained about both of said rolls and over the top surface of said table and beneath said printing member, means associated with said table surface for guiding a sheet to be printed lengthwise over said table surface and beneath said duplicating web, a slide bar mounted within said frame for rectilinear movement lengthwise of said frame, a platen element mounted within said frame and connected with said slide bar adjacent the slot, means carried by said slide bar for engaging and actuating said resetting means, a manually operable handle disposed at one side of said frame and connected with said slide bar, said handle being adapted to be advanced in one direction for causing a shifting of said slide bar thereby to move said platen element within the slot and toward said printing member so as to perform a printing operation, and to be returned in a second direction for withdrawing said platen element from said printing member and resetting said printing element, sheet-feeding means disposed within said frame and extending upwardly to the top surface of said table for engaging the sheet to be printed, and a one-way acting mechanism connecting said sheet-feeding means with said handle whereby said sheet-feeding means will be operated upon the return movement of said handle.

10. A portable printing device of the class described, comprising, a substantially rectangular shaped hollow frame, a table surface mounted on the top of said frame, said table surface having a slot disposed crosswise thereof, a printing member hingedly secured at one side of said table surface so as to extend over said slot and crosswise of said table surface, locking means positioned at the other side of said table surface for releasably maintaining said printing member in position over said slot, a pair of rolls of which each is supported at a respective one of the end portions of said frame and below the top of said table, a plurality of superimposed webs of duplicating material trained about both of said rolls and over the top surface of said table and beneath said printing member for having interleaved between said webs various sheets to be printed, a platen element mounted within said frame and beneath said table surface adjacent the slot, a handle connected with said platen element and disposed at one side of said frame, said handle member being adapted to be advanced manually in one direction for causing a movement of said platen element within the slot and toward said printing member thereby to urge said webs with their interleaved sheets against said printing member, and to be returned in a second direction for withdrawing said platen element from said printing member, means connected with said handle member for releasing said locking means whenever said handle reaches the end portion of its advance stroke, sheet-feeding means disposed within said frame and extending upwardly to the top surface of said table for engaging the sheets to be printed, and means connecting said sheet-advancing means with said handle whereby said sheet-advancing means will be actuated in response to the return movement of said handle.

11. A portable printing device of the class described, comprising, a box-like frame, a table surface mounted on the top of said frame, said table surface having a slot disposed crosswise thereof, a printing member secured at one side of said table surface so as to extend over said slot and crosswise of said table surface, printing elements carried by said member and manually operable separately for selectively setting up data to be entered on a sheet, means associated with said printing member for simultaneously resetting all of said printing elements on said printing member preparatory to setting up new data thereon, a pair of rolls of which each is supported at a respective one of the end portions of said frame and below the top of said table, a web of duplicating material trained about both of said rolls and over the top surface of said table and beneath said printing member, means associated with said table surface for guiding a sheet to be printed lengthwise over said table surface and beneath said duplicating web, a pair of slide bars mounted within and at opposite sides of said frame for rectilinear movement lengthwise of said frame, a platen roller rotatably mounted upon and between said slide bars within the confines of the slot, means carried by each of said slide bars for engaging and actuating said resetting means, a manually operable handle disposed at one side of said frame and connected with each of said slide bars by means of a pair of crank and link mechanisms, said handle being adapted to be advanced in one direction for causing a shifting of said slide bars thereby to move said platen roller toward said printing elements so as to perform a printing operation, and to be returned in a second direction for withdrawing said platen roller from said printing elements and resetting said printing elements, a sheet-feeding wheel disposed within said frame and extending upwardly to the top surface of said table for engaging the sheet to be printed, and means including a one-way pawl and ratchet wheel combination connecting said handle with said sheet-feeding wheel so that the latter will be actuated whenever said handle is moved through the return portion of its stroke.

HARRY JETTER.

REFERENCES CITED

The following references are of record in the file of this patent:

UNITED STATES PATENTS

| Number | Name | Date |
|---|---|---|
| 114,032 | O'Connor | Apr. 25, 1871 |
| 1,076,613 | Strawn | Oct. 21, 1913 |
| 1,188,427 | Fanslow | June 27, 1916 |
| 1,649,021 | De Minico | Nov. 15, 1927 |
| 1,721,104 | Carlson et al. | July 16, 1929 |
| 1,726,541 | Cole | Sept. 3, 1929 |
| 1,796,327 | Gollnick et al. | Mar. 17, 1931 |
| 1,835,340 | Satterlee | Dec. 8, 1931 |
| 1,908,060 | Sburlino | May 9, 1933 |
| 1,941,667 | Eley | Jan. 2, 1934 |
| 2,099,482 | Hill | Nov. 16, 1937 |
| 2,102,787 | Christenson | Dec. 21, 1937 |
| 2,277,924 | Morrison | Mar. 31, 1942 |
| 2,288,149 | Williams | June 30, 1942 |
| 2,296,277 | Gollwitzer | Sept. 12, 1942 |
| 2,308,907 | Anderson | Jan. 19, 1943 |
| 2,359,849 | Huber | Oct. 10, 1944 |